(12) United States Patent
Cakmak et al.

(10) Patent No.: US 9,924,326 B2
(45) Date of Patent: Mar. 20, 2018

(54) SYSTEM FOR MOVEMENT ANALYSIS OVER WIRELESS SIGNALING INFORMATION

(71) Applicant: TURKCELL TEKNOLOJI ARASTIRMA VE GELISTIRME A.S., Istanbul (TR)

(72) Inventors: Burak Cakmak, Istanbul (TR); Ayberk Cansever, Istanbul (TR); Baris Yavuz, Istanbul (TR)

(73) Assignee: TURKCELL TEKNOLOJI ARASTIRMA VE GELISTIRME A.S., Kartal Istanbul (TR)

( * ) Notice: Subject to any disclaimer, the term of this patent is extended or adjusted under 35 U.S.C. 154(b) by 0 days.

(21) Appl. No.: 15/323,225

(22) PCT Filed: Jul. 2, 2014

(86) PCT No.: PCT/IB2014/062797
§ 371 (c)(1),
(2) Date: Dec. 30, 2016

(87) PCT Pub. No.: WO2016/001717
PCT Pub. Date: Jan. 7, 2016

(65) Prior Publication Data
US 2017/0150320 A1    May 25, 2017

(51) Int. Cl.
*H04W 4/02* (2009.01)
*H04W 8/26* (2009.01)
*G06F 17/30* (2006.01)

(52) U.S. Cl.
CPC ........ *H04W 4/027* (2013.01); *G06F 17/3087* (2013.01); *G06F 17/30554* (2013.01); *H04W 4/028* (2013.01); *H04W 8/26* (2013.01)

(58) Field of Classification Search
CPC .......... H04W 4/02; H04W 4/27; H04W 24/00
See application file for complete search history.

(56) References Cited

U.S. PATENT DOCUMENTS

| 8,224,348 | B2 | 7/2012 | Bolon et al. | |
| 2011/0151839 | A1* | 6/2011 | Bolon | H04W 24/08 455/414.1 |
| 2012/0115475 | A1 | 5/2012 | Miyake et al. | |
| 2013/0084847 | A1 | 4/2013 | Tibbitts et al. | |

FOREIGN PATENT DOCUMENTS

EP    2 827 618 A1    1/2015

* cited by examiner

*Primary Examiner* — Myron K Wyche
(74) *Attorney, Agent, or Firm* — Ladas & Parry LLP

(57) ABSTRACT

The present invention is basically related to a system for retrieving movement (location) changes of the subscribers for a period of time. The said system comprises mobile station, network elements, location determination unit, location information database and a query unit.

20 Claims, 1 Drawing Sheet

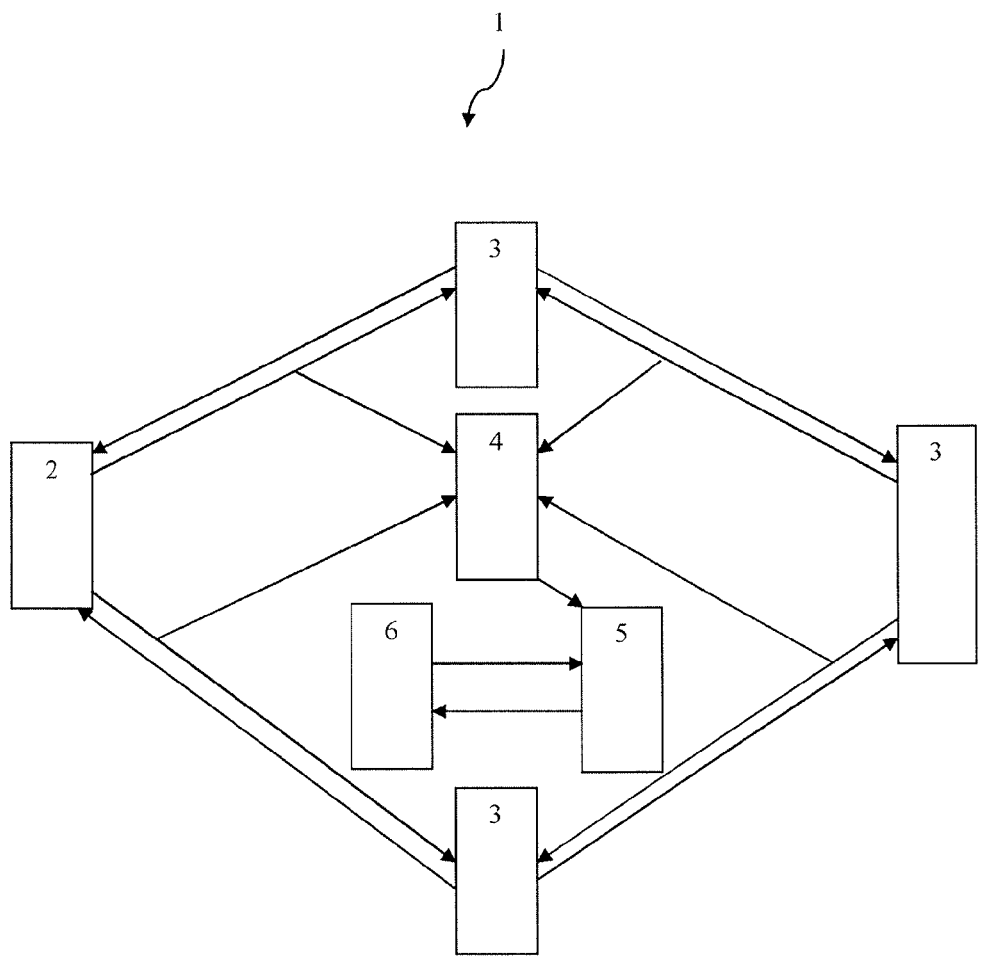

SYSTEM FOR MOVEMENT ANALYSIS OVER WIRELESS SIGNALING INFORMATION

RELATED APPLICATION INFORMATION

This application is a 371 of International Application PCT/IB2014/062797 filed 2 Jul. 2014, the disclosures of which are incorporated in their entirety by reference herein.

TECHNICAL FIELD

The present invention is basically related to a system for retrieving movement (location) changes of the subscribers for a period of time.

BACKGROUND OF THE INVENTION

Wireless network operators provide many services to their subscribers including voice call, short messaging and data services. One of the very important challenges in wireless networks is to locate and track the location changes (determining prior and next locations) of subscribers. Nature of wireless signals makes it hard to determine the location of the subscribers periodically in different time intervals as these signals propagate as long as their strength allows. There are various ways to accurately locate these subscribers periodically like timing advance or assisted GPS (Global Positioning System) with the help of satellites. However both of these methods can be used for individual usage and causes extra signaling loads on the network.

While interested in queries related to location changes of human groups rather than individuals, it is not feasible to query network for a location where thousands of subscribers may be present. Using such active methods is not efficient to retrieve prior or next locations of huge group of subscribers.

To overcome this problem in analyzing location changes of a group of subscribers and determining where those subscribers came here from and where those subscribers went to, a solution which allows queries in the historical location data, which does not depend on active retrieval of subscriber locations on network and will not introduce signaling load is needed. With the implementation of such a solution in mobile networks, movement analysis for subscribers can be achieved effectively by passively monitoring all the radio resources for specific network activities.

The U.S. Pat. No. 8,224,348, an application in the state of the art, discloses collection and analysis of network transaction information which includes the mobile device's usage, location and movements coupled with data from non-wireless network sources. Said collection and analysis allow for the automation of analysis for the detection of anti-social behaviors.

The United States patent document no. US20130084847, another application in the state of the art, discloses method and system for detecting, monitoring and/or controlling one or more of mobile services for a mobile communication device (also referred to herein as a Controllable Mobile Device or CMD), and in particular, when the device is being used and the vehicle, operated by the user of the device, is moving. The present method and system determines whether the vehicle is being operated by a user that may also have access to a mobile communication device which, if used concurrently while the vehicle is in operation, may lead to unsafe operation of the vehicle. If the mobile services control system determines that a vehicle operator has potentially unsafe access to a mobile communication device, the mobile services control system may restrict operator access to one or more services that would otherwise be available to the operator via the mobile communication device.

SUMMARY OF THE INVENTION

An objective of the present invention is to provide a system for retrieving movement changes of the subscribers for a determined period of time.

DESCRIPTION OF THE INVENTION

"A System for Movement Analysis over Wireless Signalling Information" realized to fulfill the objectives of the present invention is shown in the FIGURE attached, in which:

FIG. 1 is a schematic block diagram of the inventive system.

The components illustrated in the FIGURE are individually numbered, where the numbers refer to the following:
1. System
2. Mobile terminal
3. Network element
4. Location determination unit
5. Location information database
6. Query unit A system (1) which enables movement analysis over wireless signalling information:
- at least one mobile terminal (2) which allows a subscriber to conduct communication activities such as voice call, SMS and mobile data over a wireless network,
- at least one network element (3) that communicates with mobile terminal (2) and/or another network element (3) for communication activities which result wireless network signals,
- at least one location determination unit (4) which periodically determines the location of a subscriber using mobile terminal (2) by monitoring the network activities of mobile terminal (2) and network elements (3),
- at least one location information database (5) which stores the location data of subscribers determined by location determination unit (4) in a data model that includes unique identifier of a subscriber, timestamp for the data determination time and location information at said time,
- at least one query unit (6) which receives location queries for prior and succeeding location information of subscribers, explores the data related to query in the location information database (5) and displays it to entity which sent the query to query unit (6). (FIG. 1).

Mobile terminal (2) is the component which allows a subscriber to conduct communication activities such as voice call, SMS and mobile data over a wireless network by communicating with activity related network element (3).

Network elements (3) are the components that communicate with mobile terminal (2) and/or another network element (3) for communication activities which result wireless network signals.

In an exemplary embodiment of the invention, some of the network elements are BSC, MSC, RNC and SGSN. BSC is a component which handles allocation of radio channels, receives measurements from the mobile terminals (2) of subscribers and controls handovers from BTS (Base Transceiver Station) to BTS. MSC is the exchange and the standard component as primary service delivery node for GSM/CDMA, responsible for routing voice calls and SMS as well as other services. RNC is a governing component in the UMTS radio access network (UTRAN) and is responsible for controlling the Node B's that are connected to it. SGSN is the component responsible for the delivery of data packets from and to mobile terminals (2) within its geographical service area.

Location determination unit (4) periodically determines the location of a subscriber using mobile terminal (2) by monitoring the network activities of mobile terminal (2) and network elements (3) and records the location information of subscribers as historical data to location information database (5).

In preferred embodiment of the invention, location determination unit (4) includes an activity listener which detects subscribers' network activities from network interfaces between network elements (3). Location determination unit (4) records MSISDN of subscriber, timestamp for detection time and a geographical polygon identification information regarding to Network Cell ID (NWCI) information of network cell to a table which is called as terminal location table in the location information database (5).

Location determination unit (4) can record historical location data with data resolution of a parametric value such as 1 minute, 1 hour, 3 hours etc. In preferred embodiment of the invention, location determination unit (4) determines and records location data in every 1 hour. In preferred embodiment, location information is grid ID. In different embodiments of the invention, for determination of grid several methods can be used such as:

Last location in the resolution period (for example 1 hour) can be assigned as the location in that hour.
First location in the resolution period (for example 1 hour) can be assigned as the location in that hour.
Mostly stayed location in the resolution period (for example 1 hour) can be assigned as the location in that hour. This means the determination of location from which the number of wireless networks signals obtained in 1 hour is the most.

Location information database (5) stores the location data of subscribers determined by location determination unit (4) in a data model that includes unique identifier of a subscriber, timestamp for the data determination time and location information at said time.

In an exemplary embodiment of the invention, data is stored in location information database (5) as below:

TABLE 1

An exemplary format of data being stored in the database (5)

| MSISDN | Timestamp | Grid ID |
|---|---|---|
| XXXXXXX | 28.05.2014 09:00:00 | 555 |
| YYYYYYY | 28.05.2014 09:00:00 | 666 |
| XXXXXXX | 28.05.2014 10:00:00 | 777 |
| YYYYYYY | 28.05.2014 10:00:00 | 777 |
| XXXXXXX | 28.05.2014 11:00:00 | 888 |
| YYYYYYY | 28.05.2014 11:00:00 | 999 |

Query unit (6) receives location queries for prior and succeeding location information of subscribers, explores the data related to query in the location information database (5) and displays it to entity which sent the query to query unit (6).

When the query unit (6) receives prior location query for multiple subscribers, who are at the same location at a given time, the data in location information database (5) is queried by query unit (6) like below:

i. Query the data for a time interval (hourly resolution) for the given grids (wanted location) and get the distinct subscribers who are located on these grids.
ii. Query the locations of the subscribers, found in previous step (step i), for the desirable past time interval.

After these two steps the previous location of the subscribers are found. Obtained data explains this situation: "Where were the subscribers at time Y, who are on specific location at time X" where Y<X.

With the help of this query, for example the passengers of a flight can be determined. For instance, the subscribers who flied to city A from city B can be found by intersecting those two sets: Subscribers at city A at 14:00, subscribers at city B at 12:00.

This query is also helpful for analyzing the in-city movements. The location of subscribers, who stand in a shopping mall in the afternoon, can be queried for the morning time. In this way, the information about from where the customers of that shopping mall came to said shopping mall can be revealed.

When the query unit (6) receives succeeding location query for multiple subscribers, the data in location information database (5) is queried by query unit (6) like below:

i. Query the data for a time interval (hourly resolution) for the given grids (existing location) and get the distinct subscribers who are located on these grids.
ii. Query the locations of the subscribers, found in previous step (step i), for the desirable future time interval.

After these two steps the next location of the subscribers are found. Obtained data explains this situation: "Where are the subscribers, who were on specific location at time X, at time Y" where Y>X.

With the help of this query, for example the subscriber distribution from a specific location can be analyzed. For instance the movement from an airport can be obtained.

It is possible to develop various embodiments of the inventive system (1) especially with different network types, different data resolutions, location information types and network polygon shapes considering geographical shapes, it cannot be limited to examples disclosed herein and it is essentially according to claims.

The invention claimed is:

1. A system that enables movement analysis of multiple users over wireless signalling information by passively monitoring radio resources for specific activities of networks, comprising:
at least one mobile terminal which allows a subscriber to conduct communication activities such as voice call, SMS and mobile data over a wireless network,
at least one network element that communicates with the at least one mobile terminal and/or another network element for communication activities which utilize wireless network signals,
at least one location determination unit which periodically determines the location of a subscriber using mobile terminal by monitoring the network activities of mobile terminal and network elements,
at least one location information database which stores historical location data of the subscriber determined by the at least one location determination unit in a data model that includes a unique identifier of the subscriber, a timestamp for a data determination time, and location information of the subscriber at said data determination time, and
at least one query unit which receives from an entity a location query comprising a desired time interval and a desired location, explores the at least one location information database to retrieve the historical location data related to the location query for the desired hourly time interval and/or the desired location, and displays retrieved historical location data to the entity that sent the location query to the at least one query unit, wherein the at least one location determination unit includes an activity listener which periodically detects the network activities of the subscriber from network interfaces between the at least one network element, determines a location of the subscriber using the at least one mobile terminal by monitoring network activities of the at least one mobile terminal and the at least one network element, and records the location information of the subscriber as historical location data to the at least one location information database.

2. The system according to claim 1, wherein the at least one network element is any one of BSC, MSC, RNC, and SGSN.

3. The system according to claim 1, wherein the at least one location determination unit records an MSISDN of subscriber, a timestamp for detection time, and geographical polygon identification information regarding to Network Cell ID (NWCI) information of a network cell to a terminal location table in the at least one location information database.

4. The system according to claim 3, wherein the at least one location determination unit records historical location data with data resolution of a parametric value.

5. The system according to claim 3, wherein the at least one location determination unit records location information as grid ID.

6. The system according to claim 1, wherein the at least one query unit queries the at least one location information database by querying the historical location data for a desired past time interval in hourly resolution on desired location grids, retrieving the historical location data for a distinct group of subscribers who are located on the desired location grids, and then querying locations of the distinct group of subscribers when the historical location data for the prior location query for the distinct group of subscribers, who are at the same location as each other at a given time, is retrieved.

7. The system according to claim 1, wherein the at least one query unit queries the location information database by querying the historical location data for a desired future time interval in hourly resolution on desired location grids, and, retrieving a distinct group of subscribers who are located on the desirable location grids, and then querying locations of the distinct group of subscribers.

8. The system according to claim 2, wherein the at least one location determination unit records an MSISDN of subscriber, a timestamp for detection time, and geographical polygon identification information regarding to Network Cell ID (NWCI) information of network cell to a table which is called as terminal location table in the location information database.

9. The system according to claim 8, wherein the at least one location determination unit records historical location data with data resolution of a parametric value.

10. The system according to claim 8, wherein the at least one location determination unit records location information as grid ID.

11. A system that enables movement analysis of multiple users over wireless signalling information by passively monitoring radio resources for specific activities of networks, comprising:

at least one network element that communicates with at least one mobile terminal and/or another network element for communication activities which utilize wireless network signals, at least one location determination unit which periodically determines the location of a subscriber using mobile terminal by monitoring the network activities of mobile terminal and network elements, at least one location information database which stores historical location data of the subscriber determined by the at least one location determination unit in a data model that includes a unique identifier of the subscriber, a timestamp for a data determination time, and location information of the subscriber at said data determination time, and at least one query unit which receives from an entity a location query comprising a desired time interval and a desired location, explores the at least one location information database to retrieve the historical location data related to the location query for the desired hourly time interval and/or the desired location, and displays retrieved historical location data to the entity that sent the location query to the at least one query unit, wherein the at least one location determination unit includes an activity listener which periodically detects the network activities of the subscriber from network interfaces between the at least one network element, determines a location of the subscriber using the at least one mobile terminal by monitoring network activities of the at least one mobile terminal and the at least one network element, and records the location information of the subscriber as historical location data to the at least one location information database.

12. The system according to claim 11, wherein the at least one network element is any one of BSC, MSC, RNC, and SGSN.

13. The system according to claim 11, wherein the at least one location determination unit records an MSISDN of subscriber, a timestamp for detection time, and geographical polygon identification information regarding to Network Cell ID (NWCI) information of a network cell to a terminal location table in the at least one location information database.

14. The system according to claim 13, wherein the at least one location determination unit records historical location data with data resolution of a parametric value.

15. The system according to claim 13, wherein the at least one location determination unit records location information as grid ID.

16. The system according to claim 11, wherein the at least one query unit queries the at least one location information database by querying the historical location data for a desired past time interval in hourly resolution on desired location grids, retrieving the historical location data for a distinct group of subscribers who are located on the desired location grids, and then querying locations of the distinct group of subscribers when the historical location data for the prior location query for the distinct group of subscribers, who are at the same location as each other at a given time, is retrieved.

17. The system according to claim 11, wherein the at least one query unit queries the location information database by querying the historical location data for a desired future time interval in hourly resolution on desired location grids, and, retrieving a distinct group of subscribers who are located on the desirable location grids, and then querying locations of the distinct group of subscribers.

18. The system according to claim 12, wherein the at least one location determination unit records an MSISDN of subscriber, a timestamp for detection time, and geographical polygon identification information regarding to Network Cell ID (NWCI) information of network cell to a table which is called as terminal location table in the location information database.

19. The system according to claim 18, wherein the at least one location determination unit records historical location data with data resolution of a parametric value.

20. The system according to claim 18, wherein the at least one location determination unit records location information as grid ID.

* * * * *